United States Patent
Shibuya

(10) Patent No.: US 8,876,621 B2
(45) Date of Patent: *Nov. 4, 2014

(54) SWING ANALYZING DEVICE, SWING ANALYZING PROGRAM, AND RECORDING MEDIUM

(75) Inventor: Kazuhiro Shibuya, Shiojiri (JP)

(73) Assignee: Seiko Epson Corporation (JP)

( * ) Notice: Subject to any disclaimer, the term of this patent is extended or adjusted under 35 U.S.C. 154(b) by 208 days.

This patent is subject to a terminal disclaimer.

(21) Appl. No.: 13/489,015

(22) Filed: Jun. 5, 2012

(65) Prior Publication Data

US 2012/0316005 A1    Dec. 13, 2012

(30) Foreign Application Priority Data

Jun. 9, 2011 (JP) .................................. 2011-129135

(51) Int. Cl.
| | | |
|---|---|---|
| *A63B 69/00* | (2006.01) | |
| *G06K 9/00* | (2006.01) | |
| *G09B 19/00* | (2006.01) | |

(52) U.S. Cl.
CPC .......... *G06K 9/00543* (2013.01); *G06K 9/0055* (2013.01); *G09B 19/003* (2013.01)
USPC ....................................................... 473/212

(58) Field of Classification Search
CPC .......... G06K 9/00342; G06K 9/00543; G09B 19/0038; A63B 23/0003; A63B 23/0006; A63B 69/3632
USPC ....................................................... 473/212
See application file for complete search history.

(56) References Cited

U.S. PATENT DOCUMENTS

| | | | |
|---|---|---|---|
| 5,441,256 A | 8/1995 | Hackman | |
| 5,478,073 A | 12/1995 | Hackman | |
| 5,688,183 A | 11/1997 | Sabatino et al. | |
| 7,264,554 B2 | 9/2007 | Bentley | |
| 2001/0053720 A1* | 12/2001 | Lee et al. | ...................... 473/223 |
| 2006/0211523 A1* | 9/2006 | Sabatino | ....................... 473/453 |
| 2008/0020867 A1 | 1/2008 | Manwaring | |
| 2009/0247312 A1 | 10/2009 | Sato et al. | |

(Continued)

FOREIGN PATENT DOCUMENTS

| | | |
|---|---|---|
| EP | 1 164 355 | 12/2001 |
| JP | 04-141186 | 5/1992 |

(Continued)

OTHER PUBLICATIONS

Extended European Search Report for Application No. 12 17 0976 mailed Oct. 25, 2012 (8 pages).

(Continued)

*Primary Examiner* — Corbett B Coburn
(74) *Attorney, Agent, or Firm* — Harness, Dickey & Pierce, P.L.C.

(57) ABSTRACT

A swing analyzing device includes at least an angular velocity sensor, a data acquiring unit, and a motion detecting unit. The angular velocity sensor detects angular velocities generated about a plurality of axes by a swing. The data acquiring unit acquires detection data of the angular velocity sensor. The motion detecting unit detects at least one of motions of the swing. Particularly, the motion detecting unit includes an angular velocity calculating unit which calculates the sum of the magnitudes of the angular velocities generated about the plurality of respective axes using the acquired detection data.

14 Claims, 10 Drawing Sheets

(56) References Cited

U.S. PATENT DOCUMENTS

| | | |
|---|---|---|
| 2011/0143866 A1 | 6/2011 | McConnell |
| 2012/0108351 A1 | 5/2012 | Tamura |
| 2012/0190450 A1* | 7/2012 | Nakajima et al. ............... 463/36 |

FOREIGN PATENT DOCUMENTS

| | | |
|---|---|---|
| JP | 10-043349 | 2/1998 |
| JP | 2008-073210 | 4/2008 |
| JP | 2009-125507 | 6/2009 |
| JP | 2010-068947 | 4/2010 |

OTHER PUBLICATIONS

Extended European Search Report for Application No. EP 12 17 0975 dated Oct. 25, 2012 (8 pages).

* cited by examiner

|  | THRESHOLD VALUE | | |
|---|---|---|---|
|  | TOP INTERVAL | FINISH INTERVAL | SWING START |
| FULL SWING | A1 | A2 | A3 |
| PUTTER | B1 | B2 | B3 |

SWING ANALYZING DEVICE, SWING ANALYZING PROGRAM, AND RECORDING MEDIUM

BACKGROUND

1. Technical Field

The present invention relates to a swing analyzing device, a swing analyzing program, and a recording medium on which the swing analyzing program is recorded.

2. Related Art

In sports such as golf, tennis, and baseball, it is considered that competitive abilities can be enhanced by improving the rhythm of a swing. Particularly in golf, since a player hits a ball at rest, there is a view that the more stabilized the rhythm (allocation of time) of each of phases (back swing, top, down swing, impact, and follow through) is, the better the swing is. Therefore, some training tools or the like measure variations in the times of the phases to provide information for analysis. Moreover, JP-A-10-43349 (Patent Document 1) proposes a method in which acceleration of a trainee's body is detected and information of the acceleration is analyzed to calculate a back-swing period, a down-swing (forward-swing) period, a follow-through period, and the like. Further, JP-A-2010-68947 (Patent Document 2) proposes a method in which a motion sensor such as an angular velocity sensor is mounted on a site capable of detecting the movement of a user's trunk axis to measure an angular velocity generated by a golf swing and information of the angular velocity is analyzed to calculate the times of back swing, down swing, follow through, and the like.

However, since the acceleration information is used in the method of Patent Document 1, it is hard to detect detailed information such as the extent of a lag at top (whether a club head is swung down after a slow lag at top or is immediately swung down). Therefore, information capable of being provided for swing analysis is limited. Further, although the rhythm of a swing having a large movement such as a full swing can be detected in the method of Patent Document 1, it is necessary when detecting the rhythm of a swing having a small movement such as putting to mount an acceleration sensor on a club head, which is troublesome to handle.

Moreover, the method of Patent Document 2 calculates the rhythm of each of phases of a swing on the assumption that since in a correct golf swing, the trunk axis above the right foot is shifted to that above the left foot before and after an impact, a first peak and a second peak as two turning points (inflection points of a wave form) appear in a change in angular velocity. However, this assumption sometimes breaks down depending on user's characteristics, and therefore, a precise rhythm cannot always be detected. Moreover, also in the case of a swing with a small movement such as putting, it is considered that there is no guarantee that two distinct turning points appear in a change in angular velocity. Further, since it is necessary in the method of Patent Document 2 to detect the movement of the user's trunk axis, the position at which the angular velocity sensor is mounted or the posture is largely restricted, which is also troublesome to handle.

SUMMARY

According to some aspects of the invention, it is possible to provide a swing analyzing device which is easy to handle, detects the rhythm of a swing motion more precisely, and can detect also the rhythm of a swing with a small movement, a swing analyzing program, and a recording medium on which the swing analyzing program is recorded.

(1) An aspect of the invention is directed to a swing analyzing device including: an angular velocity sensor which detects angular velocities generated about a plurality of axes by a swing; a data acquiring unit which acquires detection data of the angular velocity sensor; and a motion detecting unit which detects at least one of motions of the swing, wherein the motion detecting unit includes an angular velocity calculating unit which calculates sum of magnitudes of the angular velocities generated about the plurality of respective axes using the acquired detection data.

According to the swing analyzing device according to the aspect of the invention, the swing motion can be detected more precisely by using the angular velocity sensor, compared to the case of using an acceleration sensor, and a swing with a small movement can also be detected.

Further, according to the swing analyzing device according to the aspect of the invention, angular velocities about a plurality of axes are detected by the angular velocity sensor, and each of the motions of the swing is detected based on the sum (norm) of the magnitudes of the angular velocities about the respective axes. Therefore, the angular velocity sensor can be mounted in any direction at a place moving in association with the swing motion, which is easy to handle.

(2) In the swing analyzing device, the motion detecting unit may include an impact detecting unit which detects a timing of an impact in the swing using the sum of the magnitudes of the angular velocities, and detect each of the motions of the swing on the basis of the timing of the impact.

The timing of an impact is most easily grasped in a series of swing motions because the value of the sum (norm) of the magnitudes of the angular velocities changes abruptly at the instant of the impact. Therefore, the timing of the impact is first detected to use the timing of the impact as a basis, so that each of the motions of the swing can be detected more reliably.

(3) In the swing analyzing device, the impact detecting unit may detect the timing at which the sum of the magnitudes of the angular velocities is maximal as the timing of the impact.

The value of the sum (norm) of the magnitudes of the angular velocities changes abruptly at the instant of an impact. Therefore, the vicinity of the maximum value can be detected as the timing of the impact, so that each of the motions of the swing can be detected more reliably.

(4) In the swing analyzing device, the motion detecting unit may include a differential calculating unit which differentiates the sum of the magnitudes of the angular velocities with respect to time.

(5) In the swing analyzing device, the impact detecting unit may detect, between the timing at which a value of the differential is maximal and the timing at which a value of the differential is minimal, the prior timing as the timing of the impact.

In a usual swing motion, an angular velocity changes abruptly at an impact due to the impact shock. Accordingly, it is possible to grasp, as the timing of the impact, the timing at which the differential value of the sum (norm) of the magnitudes of angular velocities is maximal or minimal (that is, the timing at which the differential value of the sum of the magnitudes of angular velocities is a positive maximum value or a negative minimum value) in the series of swing motions. Since equipment used for the swing vibrates due to the impact, it is considered that the timing at which the differential value of the sum (norm) of the magnitudes of angular velocities is maximal and the timing at which the differential value is minimal are generated as one pair. It is considered that the prior timing between them is the instant of the impact.

(6) In the swing analyzing device, the motion detecting unit may detect a timing at which the sum of the magnitudes of the angular velocities is a local minimum before the impact as a timing of top of the swing.

In a usual swing motion, it is considered that the motion temporarily stops at top after the start of the swing and thereafter reaches an impact with a gradual increase in swing speed. Accordingly, the timing at which the sum (norm) of the magnitudes of angular velocities is a local minimum before the timing of the impact can be grasped as the timing of the top of the swing.

(7) In the swing analyzing device, the motion detecting unit may specify a continuous interval in which the sum of the magnitudes of the angular velocities is a first threshold value or less before the impact as a top interval.

In a usual swing motion, it is considered that the swing speed is small before and after top because the motion temporarily stops at the top. Accordingly, the continuous interval in which the sum (norm) of the magnitudes of angular velocities is the first threshold value or less before the impact can be grasped as the top interval.

(8) In the swing analyzing device, the motion detecting unit may detect a timing at which the sum of the magnitudes of the angular velocities is a second threshold value or less before the top as a timing of start of the swing.

In a usual swing motion, the swing motion starts from a state at rest and is unlikely to stop until top. Accordingly, the last timing at which the sum (norm) of the magnitudes of angular velocities is the second threshold value or less before the top can be grasped as the timing of the start of the swing.

(9) In the swing analyzing device, the motion detecting unit may detect a timing at which the sum of the magnitudes of the angular velocities is a local minimum after the impact as a timing of finish of the swing.

In a usual swing motion, it is considered that the swing motion stops with a gradual decrease in swing speed after an impact. Accordingly, the timing at which the sum (norm) of the magnitudes of angular velocities is a local minimum after the impact can be grasped as the timing of the finish.

(10) In the swing analyzing device, the motion detecting unit may detect a first timing at which the sum of the magnitudes of the angular velocities is a third threshold value or less after the impact as a timing of finish of the swing.

In a usual swing motion, it is considered that the swing motion stops with a gradual decrease in swing speed after an impact. Accordingly, the first timing at which the sum (norm) of the magnitudes of angular velocities is the third threshold value or less after the impact can be grasped as the timing of the finish.

(11) In the swing analyzing device, the motion detecting unit may specify a continuous interval in which the sum of the magnitudes of the angular velocities is a fourth threshold value or less after the timing of the impact and close to the timing of the impact as a finish interval.

In a usual swing motion, it is considered that the swing motion stops with a gradual decrease in swing speed after an impact. Accordingly, the continuous interval in which the sum (norm) of angular velocities is the fourth threshold value or less after the timing of the impact and close to the timing of the impact can be grasped as the finish interval.

(12) The swing analyzing device may further include a display processing unit which calculates, based on each of the motions of the swing detected by the motion detecting unit, a time of each of the motions of the swing and displays a calculation result on a screen.

By displaying at least one of the times of the motions of the swing motion as described above, a user can grasp in detail the motions of the swing.

(13) In the swing analyzing device, the angular velocity sensor may be mountable on at least one of a user's hand, a glove, and swing equipment.

The angular velocity sensor is mountable on a user's hand or a glove, whereby it does not take time to mount the sensor and swing analysis can be easily performed. Moreover, the angular velocity sensor is mountable on swing equipment, whereby an angular velocity can be detected more precisely than when the sensor is mounted on a user's hand or a glove.

(14) In the swing analyzing device, the swing may be a golf swing. That is, the swing analyzing device may be a golf swing analyzing device.

(15) In the swing analyzing device, the motion detecting unit may detect rhythms of start of the swing, back swing, top, down swing, impact, follow through, and end of the swing.

According to this, a series of motions of a golf swing can be analyzed as rhythms.

(16) Another aspect of the invention is directed to a swing analyzing program causing a computer to function as: a data acquiring unit which acquires detection data of an angular velocity sensor detecting angular velocities generated about a plurality of axes by a swing; and a motion detecting unit which detects at least one of motions of the swing, wherein the motion detecting unit includes an angular velocity calculating unit which calculates sum of magnitudes of the angular velocities generated about the plurality of respective axes using the acquired detection data.

(17) Still another aspect of the invention is directed to a recording medium on which the swing analyzing program is recorded.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the invention will be described in detail using the drawings. The embodiment described below does not unduly limit the contents of the invention set forth in the appended claims. Moreover, not all of the configurations described below may necessarily be essential configuration requirements.

In the following, a swing analyzing device which analyzes a golf swing will be described as an example. However, the swing analyzing device according to the invention can be applied to swing analyses for various kinds of equipment used for swings, such as tennis rackets or baseball bats.

1. Configuration of Swing Analyzing Device

Figure 1:
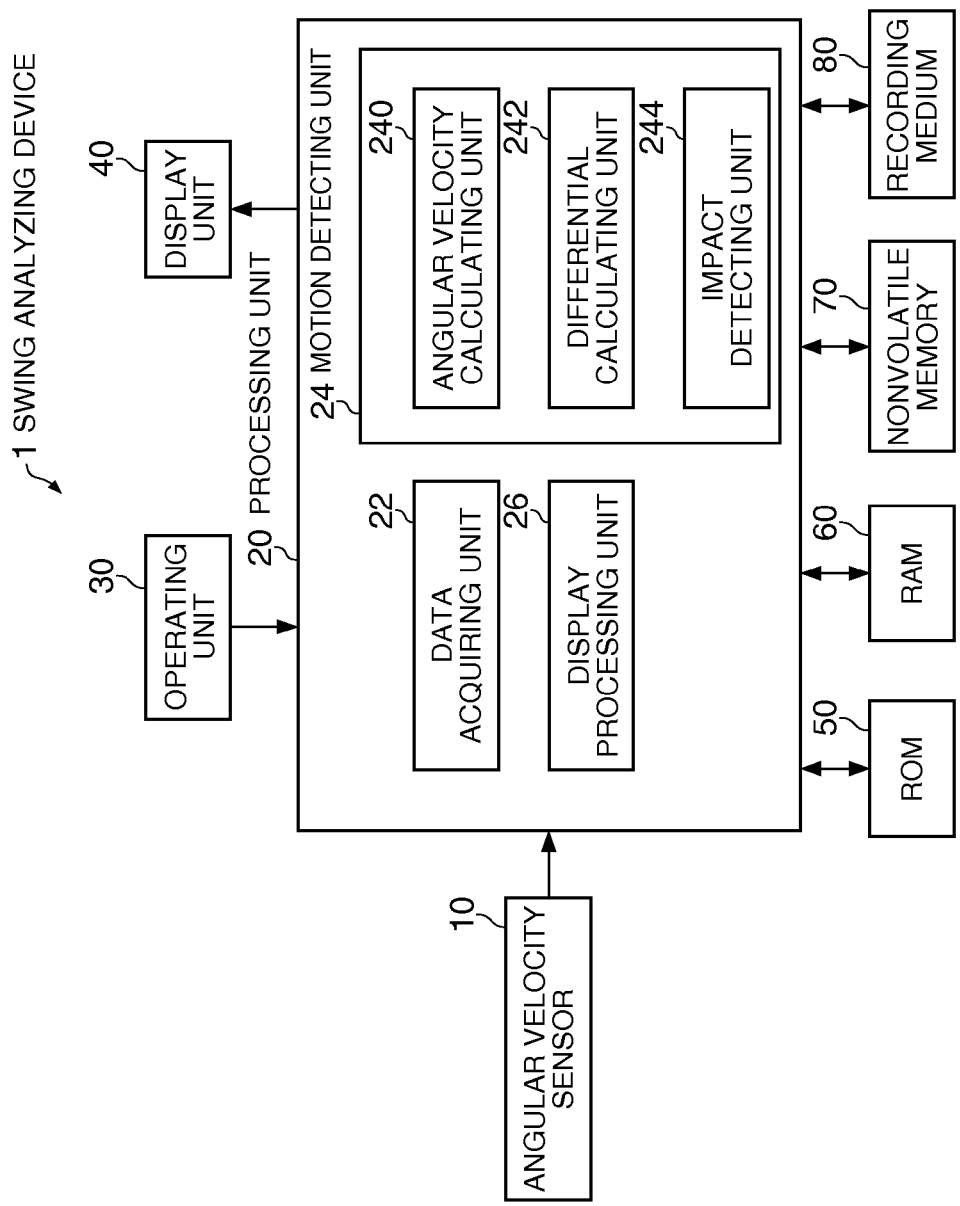
FIG. 1 shows a configuration of a swing analyzing device of an embodiment.

FIG. 1 shows a configuration of the swing analyzing device of the embodiment. The swing analyzing device 1 of the embodiment is configured to include an angular velocity sensor 10, a processing unit 20, an operating unit 30, a display unit 40, a ROM 50, a RAM 60, a nonvolatile memory 70, and a recording medium 80.

The angular velocity sensor 10 detects angular velocities about a plurality of axes generated according to a swing motion, and outputs detection data of an angular velocity about each of the axes. The angular velocity sensor 10 may be a multi-axis sensor capable of detecting angular velocities about a plurality of axes with one element, or may be a sensor mounting a plurality of single-axis sensors each capable of detecting an angular velocity about one axis with one element.

The operating unit 30 performs a process of acquiring operation data from a user and sending the data to the processing unit 20. The operating unit 30 is, for example, a touch panel display, a button, a key, a microphone, or the like.

The display unit 40 displays the processing result of the processing unit 20 as characters, a graph, or other images. The display unit 40 is, for example, a CRT, an LCD, a touch panel display, an HMD (head-mounted display), or the like. The functions of the operating unit 30 and the display unit 40 may be realized by one touch panel display.

The ROM 50 stores basic programs with which the processing unit 20 performs various kinds of calculation processes or control processes, data used for the basic programs, and the like.

The RAM 60 is used as a working area of the processing unit 20, and is a storage unit which temporarily stores a program or data read from the ROM 50 or the recording medium 80, data input from the operating unit 30, an operation result executed by the processing unit 20 according to various kinds of programs, and the like.

The nonvolatile memory 70 is a recording unit which records data needing to be stored for a long time, among data generated by the process of the processing unit 20.

The recording medium 80 stores application programs or data for realizing various kinds of application functions, and can be realized by, for example, an optical disc (CD or DVD), a magneto-optical disc (MO), a magnetic disk, a hard disk, a magnetic tape, or a memory (such as a ROM or a flash memory).

The processing unit 20 performs various kinds of processes (an acquisition process of detection data of the angular velocity sensor 10, various kinds of calculation processes, various kinds of control processes, and the like) according to the basic programs stored in the ROM 50 or the application programs stored in the recording medium 80. The processing unit 20 can be realized by a microprocessor or the like.

Particularly, in the embodiment, the processing unit 20 includes a data acquiring unit 22, a motion detecting unit 24, and a display processing unit 26, all of which will be described below, and analyzes each motion of swing motions performed by a user. In the embodiment, the processing unit 20 executes a swing analyzing program stored in the recording medium 80 to thereby function as the data acquiring unit 22, the motion detecting unit 24, and the display processing unit 26. That is, the swing analyzing program for causing a computer to function as each of the units is stored in the recording medium 80. Alternatively, a communication unit may be added to the swing analyzing device 1 to receive the swing analyzing program from a server via the communication unit via a wired or wireless communication network, and the received swing analyzing program may be stored in the RAM 60 or the recording medium 80 to execute the swing analyzing program. However, at least a part of the data acquiring unit 22, the motion detecting unit 24, and the display processing unit 26 may be realized by hardware (dedicated circuit).

The data acquiring unit 22 performs a process of successively acquiring a series of detection data of the angular velocity sensor 10 on a swing motion of a user. The acquired data is stored in, for example, the RAM 60.

The motion detecting unit 24 performs a process of detecting at least one of motions of a user's swing based on the detection data acquired by the data acquiring unit 22. Particularly, the motion detecting unit 24 of the embodiment includes an angular velocity calculating unit 240, a differential calculating unit 242, and an impact detecting unit 244. However, the motion detecting unit 24 of the embodiment may be configured by omitting a part or all of these configurations (constituents) or adding a new configuration (constituent).

The angular velocity calculating unit 240 performs, based on the detection data acquired by the data acquiring unit 22, a process of calculating the sum (norm) of the magnitudes of angular velocities about a plurality of axes. In the following, the sum of the magnitudes of angular velocities generated about respective axes is expressed as "norm".

The differential calculating unit 242 performs a process of differentiating the norm of angular velocities calculated by the angular velocity calculating unit 240 with respect to time.

The impact detecting unit 244 performs a process of detecting the timing of an impact in a swing using the norm of angular velocities calculated by the angular velocity calculating unit 240. The impact detecting unit 244 may detect the timing at which the norm of angular velocities is maximal as the timing of an impact. Alternatively, the impact detecting unit 244 may detect, between the timing at which the differential value of the norm of angular velocities calculated by the differential calculating unit 242 is maximal and the timing at which the differential value is minimal, the prior timing as the timing of an impact.

The motion detecting unit 24 may detect the timing at which the norm of angular velocities calculated by the angular velocity calculating unit 240 is a local minimum before the impact detected by the impact detecting unit 244 as the timing of top of the swing.

Moreover, the motion detecting unit 24 may specify a continuous interval in which the norm of angular velocities is a first threshold value or less before the impact as a top interval (lag interval at top).

Moreover, the motion detecting unit 24 may detect the timing at which the norm of angular velocities is a second threshold value or less before the top as the timing of start of the swing.

Moreover, the motion detecting unit 24 may detect the timing at which the norm of angular velocities is a local minimum after the impact as the timing of the end (finish) of the swing. Alternatively, the motion detecting unit 24 may detect the first timing at which the norm of angular velocities is a third threshold value or less after the impact as the timing of end (finish) of the swing.

Moreover, the motion detecting unit 24 may specify a continuous interval in which the norm of angular velocities is a fourth threshold value or less after the timing of the impact and close to the timing of the impact as a finish interval.

The display processing unit 26 performs, based on each motion of a user's swing detected by the motion detecting unit 24, a process of calculating the time of each motion of the swing and displaying the calculation result on a screen (the display unit 40).

The processing unit 20 of the embodiment may be configured by omitting a part of these configurations (constituents) or adding a new configuration (constituent).

All or apart of the functions of the processing unit 20, the operating unit 30, the display unit 40, the ROM 50, the RAM 60, the nonvolatile memory 70, and the recording medium 80 can be realized by a personal computer (PC), or a mobile device such as a smartphone.

The swing analyzing device 1 may be configured as one of a separate type in which the angular velocity sensor 10 and the processing unit 20 are physically separated from each other, and wireless or wired data communication may be performed between the angular velocity sensor 10 and the processing unit 20. Alternatively, the swing analyzing device 1 may be configured as one of an integral type in which the angular velocity sensor 10 and the processing unit 20 are disposed in one case.

Figure 2A:
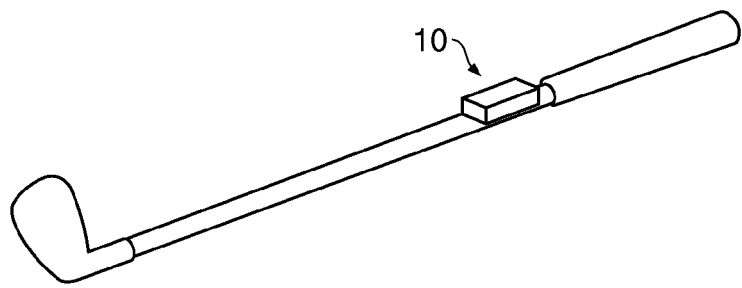
FIGS. 2A to 2C each show one example of a mounting position of an angular velocity sensor.
Figure 2B:
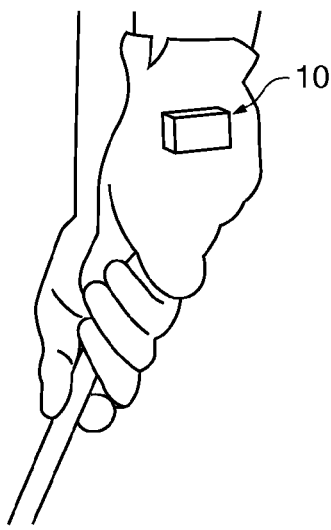
Figure 2C:
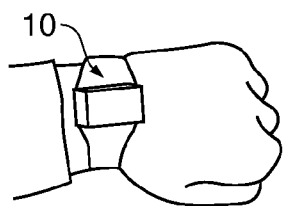

When the swing analyzing device 1 is configured as one of the separate type, the angular velocity sensor 10 is mounted at any position capable of detecting an angular velocity generated according to a swing motion. For example, the angular velocity sensor 10 is mounted on swing equipment such as a golf club as shown in FIG. 2A. However, it is preferable to mount the angular velocity sensor 10 on a shaft as shown in the drawing so that the angular velocity sensor 10 is not subjected to the influence of shock at an impact. Other than that, the angular velocity sensor 10 may be mounted on a user's hand or a glove as shown in FIG. 2B, or may be mounted on an accessory such as a wristwatch as shown in FIG. 2C.

Moreover, when the swing analyzing device 1 is configured as one of the integral type, the swing analyzing device 1 itself may be mounted on swing equipment such as a golf club, a user's hand, a glove, an accessory, or the like.

2. Process of Swing Analyzing Device

2-1. Entire Process of Swing Analysis

Figure 3:
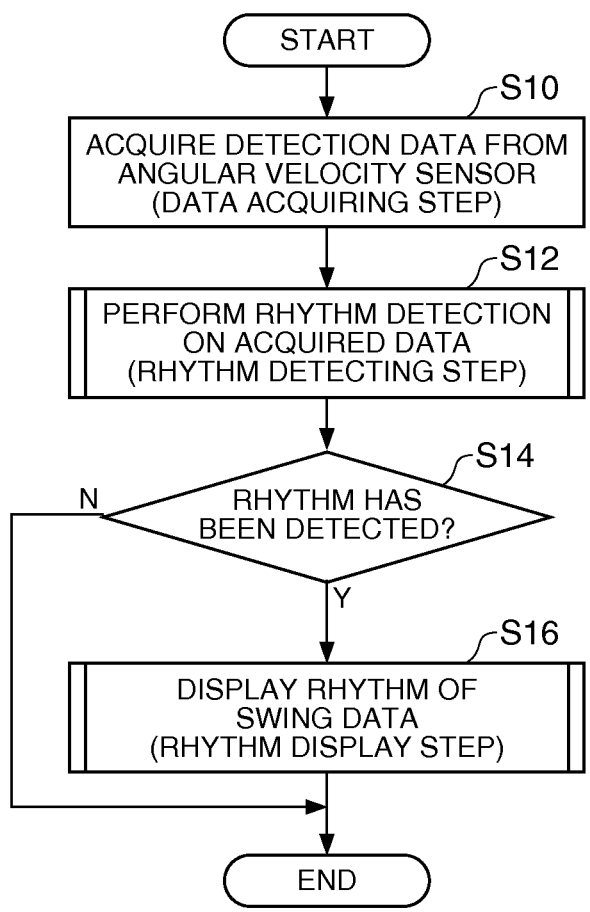
FIG. 3 is a flowchart showing one example of the entire process of swing analysis.

FIG. 3 is a flowchart showing one example of the entire process of swing analysis performed by the processing unit 20 of the swing analyzing device 1.

As shown in FIG. 3, the processing unit 20 of the embodiment first functions as the data acquiring unit 22 to acquire detection data from the angular velocity sensor 10 (S10: data acquiring step). A period (data acquiring period) in which the data acquiring unit 22 acquires the data from the angular velocity sensor 10 is set by some kind of method. For example, a user or an assistant may operate the operating unit 30 before the start of a swing to thereby indicate the start timing of the data acquiring period, and may operate the operating unit 30 after the end of the swing to thereby indicate the end timing of the data acquiring period. Moreover, for example, a user or an assistant may operate the operating unit 30 before the start of a swing to thereby indicate the start timing of the data acquiring period, and the data acquiring period may automatically end after an elapse of a predetermined time.

Next, the processing unit 20 functions as the motion detecting unit 24 to perform rhythm detection on the data acquired at Step S10 (S12: rhythm detecting step). The term "rhythm(s)" used herein means a series of motions from the start of a swing to the end of the swing, and corresponds to, in the case of a golf swing for example, a series of motions of the start of a swing, back swing, top, down swing, impact, follow through, and the end of the swing.

If the rhythm has not been detected at Step S12 (N at S14), it is determined that data (swing data) corresponding to a swing motion has not been included in the acquired data, and the process ends. In this case, the fact that the swing data was not included in the acquired data may be displayed on the display unit 40.

On the other hand, if the rhythm has been detected at Step S12 (Y at S14), the processing unit 20 functions as the display processing unit 26 to display, on the display unit 40, the rhythm of the data from which the rhythm has been detected at Step S12, that is, the rhythm of the swing data corresponding to the swing motion of a user (S16: rhythm display step), and ends the process.

2-2. Rhythm Detection Process

Figure 4:
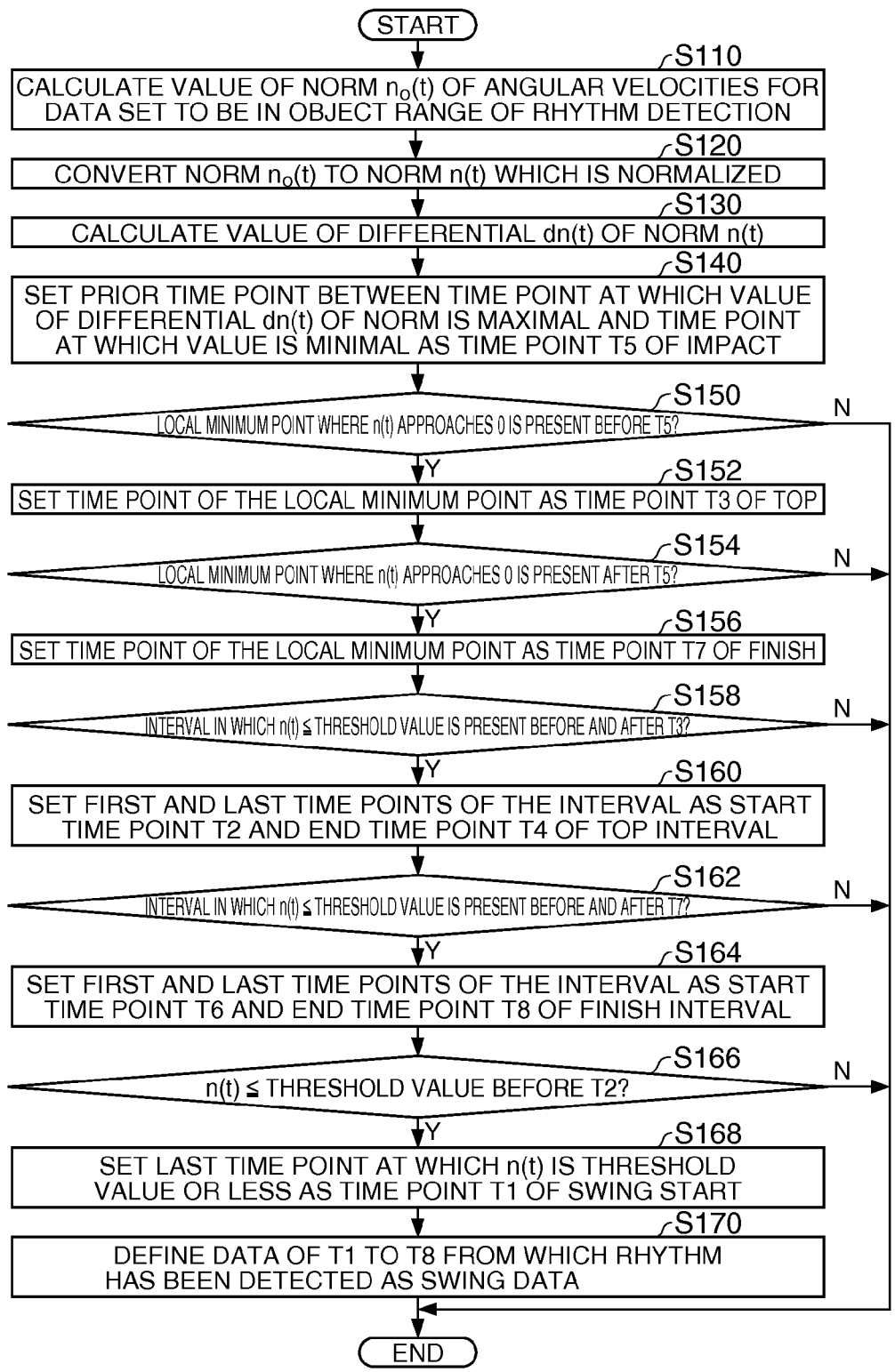
FIG. 4 is a flowchart showing one example of a detection process of a swing motion.

FIG. 4 is a flowchart showing one example of a rhythm detection process performed by the processing unit 20 (the motion detecting unit 24).

As shown in FIG. 4, the processing unit 20 (the motion detecting unit 24) first functions as the angular velocity calculating unit 240 to calculate the value of a norm $n_0(t)$ of angular velocities at each of time points t from the acquired data (S110). As one example of a method of obtaining the norm (sum of the magnitudes of angular velocities) of angular velocities, there is a method of obtaining the norm from "the square root of the sum of the squares of the magnitudes of angular velocities". For example, when it is assumed that the angular velocity sensor 10 detects angular velocities about three axes, and that detection data corresponding to three axes at each of the time points t in a data acquiring period are defined as $x(t)$, $y(t)$, and $z(t)$, the norm $n_0(t)$ of the angular velocities is calculated by the following expression (1).

$$n_0(t) = \sqrt{x(t)^2 + y(t)^2 + z(t)^2} \tag{1}$$

Next, the processing unit 20 (the motion detecting unit 24) converts the norm $n_0(t)$ of the angular velocities at each of the time points t to a norm $n(t)$ which is normalized in a predetermined range (S120). Specifically, when the maximum value of the norm of the angular velocities in the data acquiring period is defined as $\max(n_0)$, the norm $n_0(t)$ of the angular velocities is converted by the following expression (2) to the norm n(t) which is normalized in the range of from 0 to 100.

$$n(t) = \frac{100 \times n_0(t)}{\max(n_0)} \quad (2)$$

Next, the processing unit 20 (the motion detecting unit 24) functions as the differential calculating unit 242 to calculate the value of a differential dn(t) of the norm (norm after normalization) n(t) at each of the time points t (S130). For example, an acquisition interval of the detection data of angular velocities is defined as Δt, the differential (difference) dn(t) of the norm of the angular velocities at the time point t is calculated by the following expression (3).

$$dn(t)=n(t)-n(t-\Delta t) \quad (3)$$

Next, the processing unit 20 (the motion detecting unit 24) functions as the impact detecting unit 244 to set, between a time point at which the value of the differential dn(t) of the norm is maximal and a time point at which the value is minimal, the prior time point as a time point T5 of the impact (S140). In a usual golf swing, it is considered that the swing speed is maximal at the instant of the impact. Then, it is considered that the value of the norm of angular velocities also changes according to the swing speed. Therefore, the timing at which the differential value of the norm of angular velocities is maximal or minimal (that is, the timing at which the differential value of the norm of angular velocities is a positive maximum value or a negative minimum value) in the series of swing motions can be grasped as the timing of the impact. Since a golf club vibrates due to the impact, it is considered that the timing at which the differential value of the norm of angular velocities is maximal and the timing at which the differential value is minimal are generated as one pair. It is considered that the prior timing between them is the instant of the impact.

Next, the processing unit 20 (the motion detecting unit 24) determines whether or not a local minimum point where the value of the norm n(t) approaches 0 is present before the time point T5 of the impact (S150). If present (Y at S150), the time point of the local minimum point is set as a time point T3 of top (S152). In a usual golf swing, it is considered that the motion temporarily stops at top after the start of the swing and thereafter reaches an impact with a gradual increase in swing speed. Accordingly, the timing at which the norm of angular velocities approaches 0 to be a local minimum before the timing of the impact can be grasped as the timing of the top.

On the other hand, if the local minimum point where the value of the norm n(t) approaches 0 is not present before the time point T5 of the impact (N at S150), the processing unit 20 (the motion detecting unit 24) determines that the rhythm detection for the acquired data has failed (swing data is not included in the acquired data), and ends the process.

Next, the processing unit 20 (the motion detecting unit 24) determines whether or not a local minimum point where the value of the norm n(t) approaches 0 is present after the time point T5 of the impact (S154). If present (Y at S154), the time point of the local minimum point is set as a time point T7 of finish (S156). In a usual golf swing, it is considered that the swing stops after an impact with a gradual decrease in swing speed. Accordingly, the timing at which the norm of angular velocities approaches 0 to be a local minimum after the timing of the impact can be grasped as the timing of the finish.

On the other hand, if the local minimum point where the value of the norm n(t) approaches 0 is not present after the time point T5 of the impact (N at S154), the processing unit 20 (the motion detecting unit 24) determines that the rhythm detection for the acquired data has failed (swing data is not included in the acquired data), and ends the process.

Next, the processing unit 20 (the motion detecting unit 24) determines whether or not an interval in which the value of the norm n(t) is a preset threshold value (one example of the first threshold value) or less is present before and after the time point T3 of the top (S158). If present (Y at S158), the first and last time points of the interval are set respectively as a start time point T2 and an end time point T4 of the top interval (S160). In a usual golf swing, since the motion temporarily stops at top, it is considered that the swing speed is small before and after the top. Accordingly, a continuous interval in which the timing of the top is included and the norm of angular velocities is a given threshold value or less can be grasped as the top interval.

On the other hand, if the interval in which the value of the norm n(t) is the threshold value or less is not present before and after the time point T3 of the top (N at S158), the processing unit 20 (the motion detecting unit 24) determines that the rhythm detection for the acquired data has failed (swing data is not included in the acquired data), and ends the process.

Next, the processing unit 20 (the motion detecting unit 24) determines whether or not an interval in which the value of the norm n(t) is a preset threshold value (one example of the fourth threshold value) or less is present before and after the time point T7 of the finish (S162). If present (Y at S162), the first and last time points of the interval are set respectively as a start time point T6 and an end time point T8 of the finish interval (S164). In a usual golf swing, it is considered that the swing stops after an impact with a gradual decrease in swing speed. Accordingly, a continuous interval in which the timing of the finish is included and the norm of angular velocities is a given threshold value or less can be grasped as the finish interval.

On the other hand, the interval in which the value of the norm n(t) is the threshold value or less is not present before and after the time point T7 of the finish (N at S162), the processing unit 20 (the motion detecting unit 24) determines that the rhythm detection for the acquired data has failed (swing data is not included in the acquired data), and ends the process.

Next, the processing unit 20 (the motion detecting unit 24) determines whether or not the value of the norm n(t) is a preset threshold value (one example of the second threshold value) or less before the start time point T2 of the top interval (S166). If the value of the norm n(t) is the threshold value or less (Y at S166), the last time point at which the value of the norm n(t) is the threshold value or less is set as a time point T1 of swing start (S168). A local minimum point where the norm approaches 0 before the local minimum point for specifying the top may be deemed as the swing start. In a usual golf swing, the swing motion starts from a state at rest and is unlikely to stop until top. Accordingly, the last timing at which the norm of angular velocities is the threshold value or less before the timing of the top can be grasped as the timing of the start of the swing motion.

On the other hand, if the value of the norm n(t) is not the threshold value or less before the start time point T2 of the top interval (N at S166), the processing unit 20 (the motion detecting unit 24) determines that the rhythm detection for the acquired data has failed (swing data is not included in the acquired data), and ends the process.

Finally, the processing unit 20 (the motion detecting unit 24) defines the data of T1 to T8 from which the rhythm has been detected as swing data (S170), and ends the process.

Figures 5, 6:
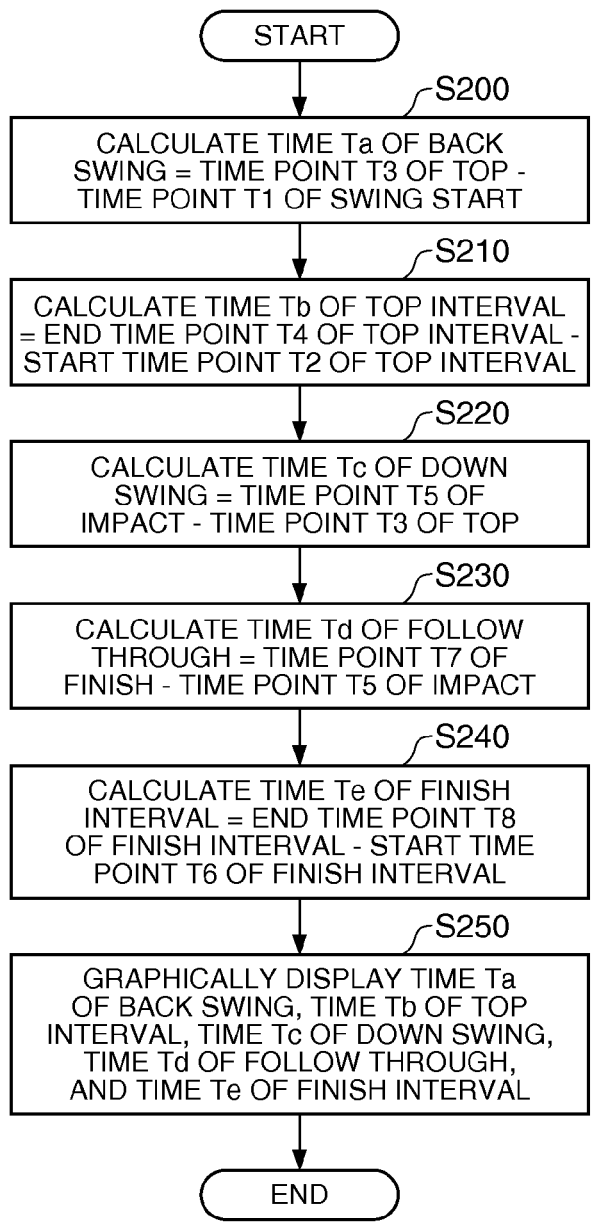
FIG. 5 shows one example of a threshold value table of top interval, finish interval, and swing start.
FIG. 6 is a flowchart showing one example of a display process of a swing motion.

The respective threshold values of the top interval, the finish interval, and the swing start are stored as, for example, table data shown in FIG. 5 in the ROM 50, the RAM 60, or the like. These threshold values may be fixed values or variable values (for example, individually set for every user). When the respective threshold values are previously provided corresponding to the motions as shown in FIG. 5, even if a plurality of local minimum points are generated, a local minimum point corresponding to a swing can be easily extracted.

The steps in the flowchart of FIG. 4 may be appropriately replaced with each other.

Moreover, in the flowchart of FIG. 4, it is possible to omit the step (S130) of calculating the value of the differential dn(t) of the norm (norm after normalization) n(t) at each of the time points t. Particularly, for a swing having a large change in the norm of angular velocities, like a driver swing, the differential step (S130) can be omitted. When S130 is omitted, the maximum value of the norm of angular velocities obtained at S120 may be detected as the timing of the impact.

Moreover, at Step S154 and Step S156 in the flowchart of FIG. 4, the local minimum point where the value of the norm n(t) of angular velocities approaches 0 after the timing of the impact is set as the timing of the finish. However, for example, the first timing at which the value of the norm n(t) of angular velocities is the preset threshold value (one example of the third threshold value) or less after the impact may be set as the timing of the finish of a swing.

Moreover, in the flowchart of FIG. 4, all of the motions of the start of a swing, back swing, top, down swing, impact, follow through, and the end of the swing are detected. However, for example, at least one motion of the swing motions may be detected, such as the case where only the motions of impact and down swing are detected.

2-3. Rhythm Display Process

FIG. 6 is a flowchart showing one example of a rhythm display process performed by the processing unit 20 (the display processing unit 26).

First, the processing unit 20 (the display processing unit 26) calculates a time Ta of back swing=the time point T3 of the top−the time point T1 of the swing start (S200).

Next, the processing unit 20 (the display processing unit 26) calculates a time Tb of the top interval=the end time point T4 of the top interval−the start time point T2 of the top interval (S210).

Next, the processing unit 20 (the display processing unit 26) calculates a time Tc of down swing=the time point T5 of the impact−the time point T3 of the top (S220).

Next, the processing unit 20 (the display processing unit 26) calculates a time Td of follow through=the time point T7 of the finish−the time point T5 of the impact (S230).

Next, the processing unit 20 (the display processing unit 26) calculates a time Te of the finish interval=the end time point T8 of the finish interval−the start time point T6 of the finish interval (S240).

Finally, the processing unit 20 (the display processing unit 26) graphically displays, on the display unit 40, the times (the time Ta of the back swing, the time Tb of the top interval, the time Tc of the down swing, the time Td of the follow through, and the time Te of the finish interval) of the phases calculated respectively at Step S200 to Step S240 (S250).

Figure 7:
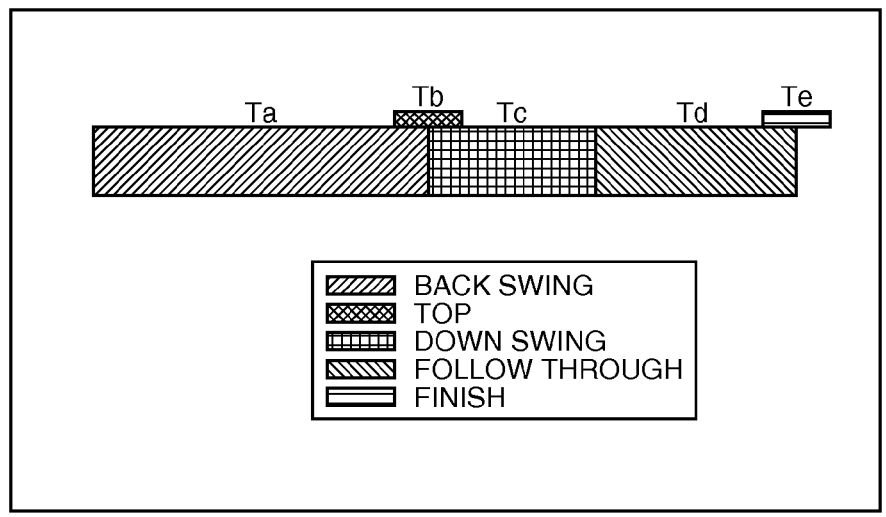
FIG. 7 shows one example of display of the swing motion.

FIG. 7 shows one example of rhythm display of a swing motion. In the display example of FIG. 7, the respective phases (back swing, top interval, down swing, follow through, and finish interval) in the swing motion are displayed in time series as rectangles with lengths proportional to the respective times Ta, Tb, Tc, Td, and Te and each having a specific color or pattern. Moreover, the respective times Ta, Tb, Tc, Td, and Te are displayed above the display of the rectangles of the respective phases. With such rhythm display, a user can obtain detailed information on the rhythms of his/her own swing motion, such as that, for example, a lag is insufficient at top because the time Tb of the top interval is short, or that the impact is weak because the time Tc of the down swing is long. Moreover, not only are all the rhythms of the swing displayed, but also the time may be displayed at each motion of the swing.

3. Experimental Example

FIGS. 8 to 12 relate to an experimental example of rhythm analysis of a swing motion using the swing analyzing device 1 of the embodiment.

Figure 8:
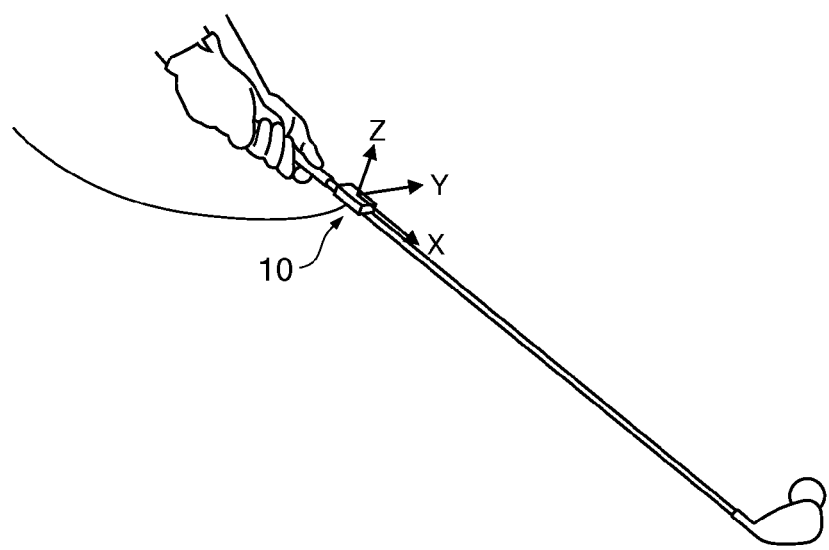
FIG. 8 is an explanatory view of the mounting position and direction of the angular velocity sensor in an experimental example.

As shown in FIG. 8, in the experimental example, the angular velocity sensor 10 which detects angular velocities about three axes was mounted in the vicinity of the grip of the shaft of a golf club, and the rhythms when a subject made a swing only once to hit a golf ball were analyzed. The angular velocity sensor 10 was mounted such that an x-axis is a direction parallel to the shaft, a y-axis is a direction of the swing, and a z-axis is a direction perpendicular to a plane of the swing. However, since the swing analyzing device 1 of the embodiment calculates the time of each of the phases based on the norm of angular velocities, any mounting angle can be set for the angular velocity sensor 10. Moreover, the angular velocity sensor 10 was connected to a not-shown PC (including the processing unit 20, the operating unit 30, the display unit 40, the ROM 50, the RAM 60, the nonvolatile memory 70, and the recording medium 80) with a cable, a series of data of angular velocities about the three axes detected by the angular velocity sensor 10 was acquired in the RAM 60 by the PC, and the rhythms of swing data included in the acquired data were analyzed and displayed. As golf clubs, two kinds of golf clubs, a driver and a putter, were selected, and rhythm analysis was performed on each of them.

Figure 9A:
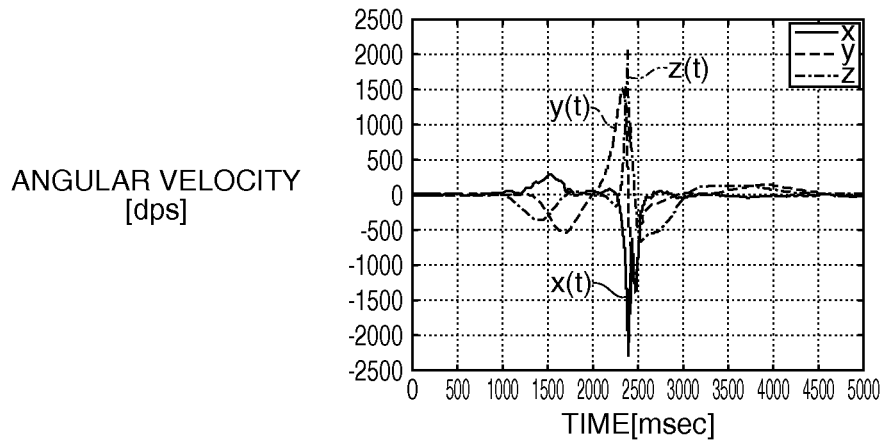
FIG. 9A graphically displays angular velocities about three axes at the time of a full swing, FIG. 9B graphically displays the calculated value of the sum (norm) of the magnitudes of angular velocities about the three axes, and FIG. 9C graphically displays the calculated value of the differential of the sum (norm) of the magnitudes of angular velocities about the three axes.

FIG. 9A graphically displays angular velocities x(t), y(t), and z(t) about the three axes based on data acquired in a data acquiring period (for 5 sec) when the subject picked up the driver to make a full swing. In FIG. 9A, the horizontal axis represents a time (msec) while the vertical axis represents an angular velocity (dps).

Figure 9B:
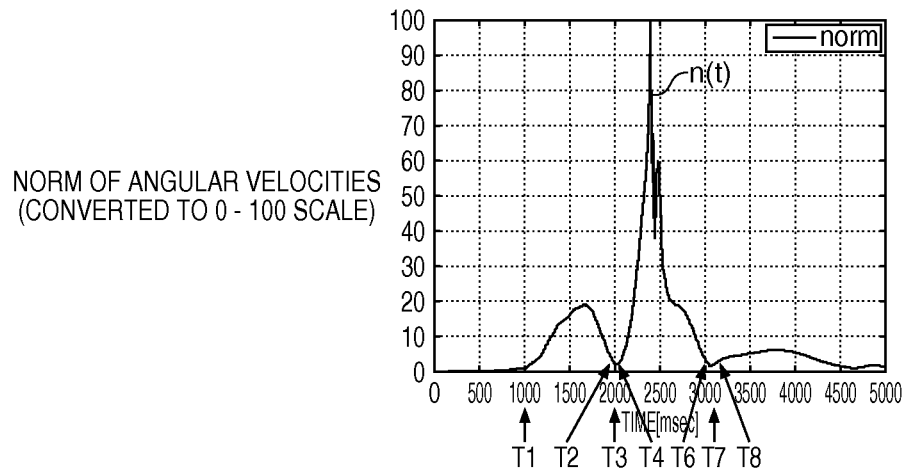

FIG. 9B graphically displays the norm n(t) obtained by calculating the norm $n_0(t)$ of angular velocities about three axes, from the angular velocities x(t), y(t), and z(t) about the three axes of FIG. 9A, according to the expression (1), and thereafter converting (normalizing) the norm $n_0(t)$ to a 0 to 100 scale according to the expression (2). In FIG. 9B, the horizontal axis represents a time (msec) while the vertical axis represents the norm (converted to a 0 to 100 scale) of angular velocities.

Figure 9C:
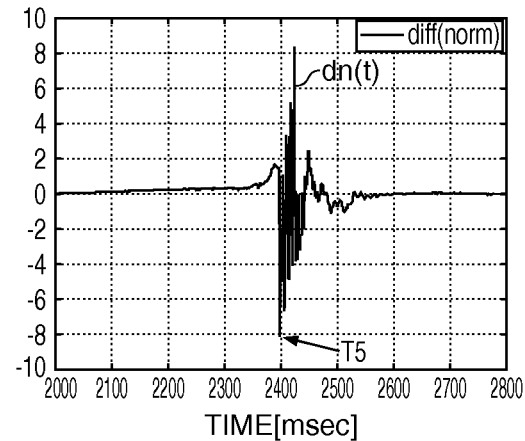
Figure 10:
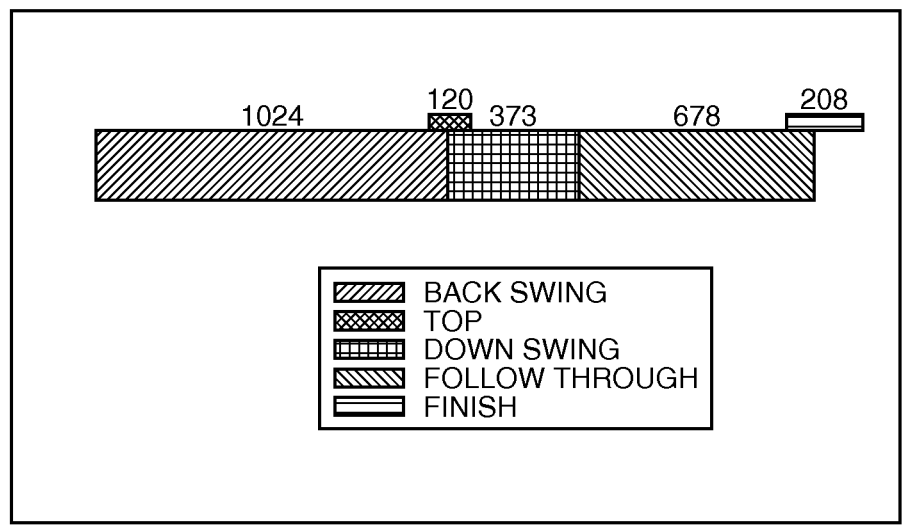
FIG. 10 shows display of the swing motion at the time of the full swing.

FIG. 9C graphically displays the differential dn(t) obtained by calculating from the norm n(t) of angular velocities about three axes of FIG. 19B according to the expression (3). In FIG. 9C, the horizontal axis represents a time (msec) while the vertical axis represents the differential value of the norm of angular velocities about three axes. In FIGS. 9A and 9B, the horizontal axis ranges from 0 to 5 sec. However, the horizontal axis in FIG. 9C ranges from 2 to 2.8 sec so that a change in differential value before and after an impact is seen.

Referring to FIGS. 9B and 9C, the time point T1 of the swing start, the start time point T2 of the top interval, the time point T3 of the top, the end time point T4 of the top interval, the time point T5 of the impact, the start time point T6 of the finish interval, the time point T7 of the finish, and the end time point T8 of the finish interval were calculated according to the flowchart of the rhythm detection process shown in FIG. 4. The results were T1=1000 msec, T2=1967 msec, T3=2024 msec, T4=2087 msec, T5=2397 msec, T6=3002 msec, T7=3075 msec, and T8=3210 msec.

Next, according to the flowchart of the rhythm display process shown in FIG. 6, the calculated values of T1 to T8 were used to calculate the time Ta of the back swing, the time Tb of the top interval, the time Tc of the down swing, the time Td of the follow through, and the time Te of the finish interval. The results were Ta=T3−T1=1024 msec, Tb=T4−T2=120 msec, Tc=T5−T3=373 msec, Td=T7−T5=678 msec, and Te=T8−T6=208 msec. The rhythm display shown in FIG. 10 was obtained. In this manner, detailed rhythm data relating to a strong swing motion such as a full swing was obtained.

Figure 11A:
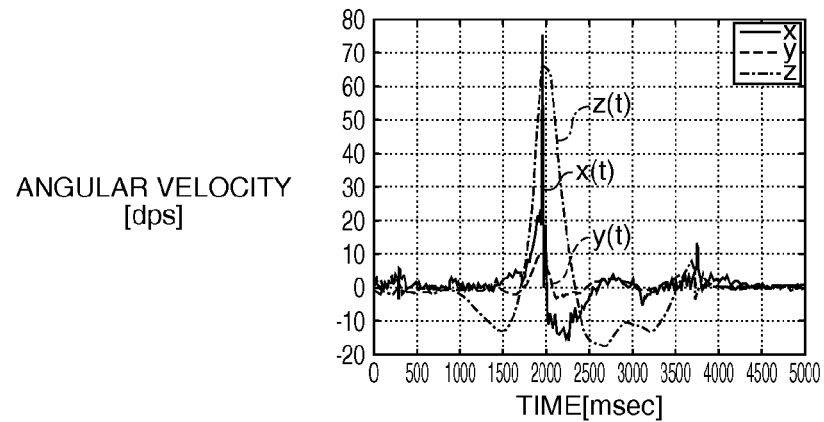
FIG. 11A graphically displays angular velocities about three axes at the time of putting, FIG. 11B graphically displays the calculated value of the sum (norm) of the magnitudes of angular velocities about the three axes, and FIG. 11C graphically displays the calculated value of the differential of the sum (norm) of the magnitudes of angular velocities about the three axes.

In contrast to this, FIG. 11A graphically displays the angular velocities x(t), y(t), and z(t) about the three axes based on data acquired in a data acquiring period (for 5 sec) when the subject picked up the putter to putt. In FIG. 11A, the horizontal axis represents a time (msec) while the vertical axis represents an angular velocity (dps).

Figure 11B:
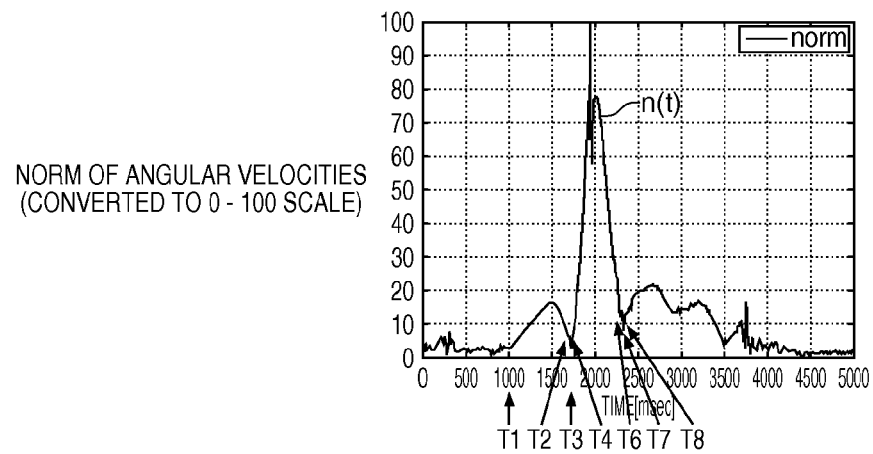

FIG. 11B graphically displays the norm n(t) obtained by calculating the norm $n_0(t)$ of angular velocities about three axes, from the angular velocities x(t), y(t), and z(t) about the three axes of FIG. 11A, according to the expression (1), and thereafter converting (normalizing) the norm $n_0(t)$ to a 0 to 100 scale according to the expression (2). In FIG. 11B, the horizontal axis represents a time (msec) while the vertical axis represents the norm (converted to a 0 to 100 scale) of angular velocities.

Figure 11C:
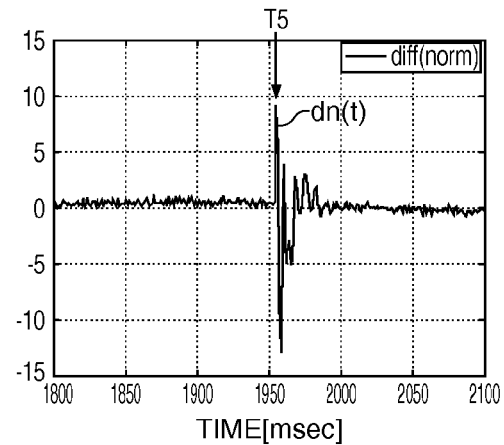
Figure 12:
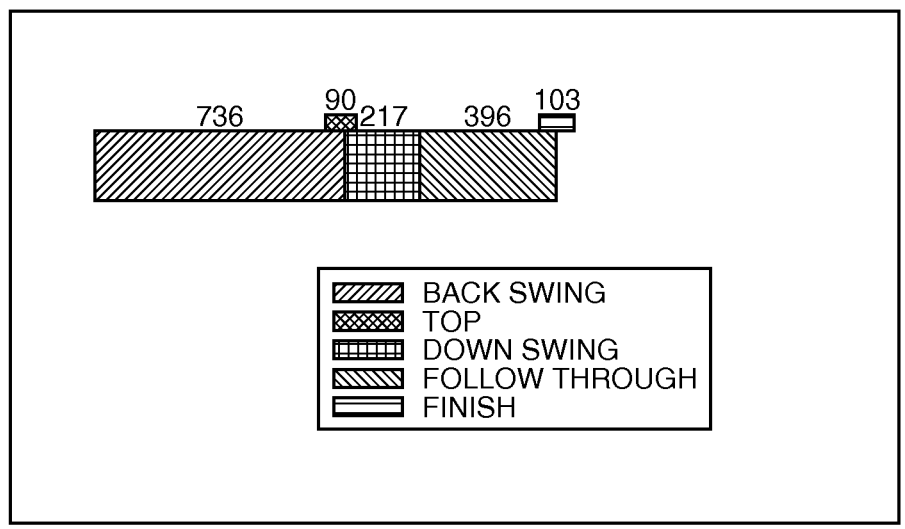
FIG. 12 shows display of a swing motion at the time of putting.

FIG. 11C graphically displays the differential dn(t) obtained by calculating from the norm n(t) of angular velocities about three axes of FIG. 11B according to the expression (3). In FIG. 11C, the horizontal axis represents a time (msec) while the vertical axis represents the differential value of the norm of angular velocities about three axes.

Referring to FIGS. 11B and 11C, the time point T1 of the swing start, the start time point T2 of the top interval, the time point T3 of the top, the end time point T4 of the top interval, the time point T5 of the impact, the start time point T6 of the finish interval, the time point T7 of the finish, and the end time point T8 of the finish interval were calculated according to the flowchart of the rhythm detection process shown in FIG. 4. The results were T1=1000 msec, T2=1680 msec, T3=1736 msec, T4=1770 msec, T5=1953 msec, T6=2302 msec, T7=2349 msec, and T8=2405 msec.

Next, according to the flowchart of the rhythm display process shown in FIG. 6, the calculated values of T1 to T8 were used to calculate the time Ta of the back swing, the time Tb of the top interval, the time Tc of the down swing, the time Td of the follow through, and the time Te of the finish interval. The results were Ta=T3−T1=736 msec, Tb=T4−T2=90 msec, Tc=T5−T3=217 msec, Td=T7−T5=396 msec, and Te=T8−T6=103 msec. The rhythm display shown in FIG. 12 was obtained. In this manner, even for a weak swing motion such as putting, detailed rhythm data was obtained.

In the examples of FIGS. 9A to 9C and FIGS. 11A to 11C as described above, the step (S130) of calculating the value of the differential dn(t) of the norm (norm after normalization) n(t) at each of the time points t can be omitted. Particularly, for a swing having a large change in the norm of angular velocities, like a driver swing of FIGS. 9A to 9C, the differential step (S130) can be omitted. In the case of omitting the differential step, the maximum value of the norm (FIGS. 9B and 11B) of angular velocities obtained at S120 may be detected as the timing of the impact.

According to the embodiment as described above, a swing motion can be detected more precisely by using the angular velocity sensor 10, compared to the case of using an acceleration sensor, and a swing with a small movement can also be detected. Accordingly, more detailed analysis can be performed, such as for example, how slowly a golf club lags behind at top and finish. Moreover, it is possible on the basis of the impact to detect at least one of the motions of the start of a swing, back swing, top, down swing, follow through, and the end of the swing.

Further, according to the embodiment, since a swing motion is detected based on the norm of angular velocities, the angular velocity sensor 10 can be mounted in any direction at a place moving in association with the swing motion. Therefore, the angular velocity sensor 10 is easy to handle.

Moreover, according to the embodiment, the timing of the impact, which is most easily grasped in the series of swing motions because the value of the norm of angular velocities changes abruptly, is first detected, and each of the phases of the swing motions is specified based on the timing of the impact, whereby the swing motion can be detected more reliably.

Moreover, according to the embodiment, since the time of each of the phases of the swing motions is displayed, a user can easily grasp detailed rhythms of the swing motions.

The invention is not limited to the embodiment, and various kinds of modifications can be implemented within the range of the gist of the invention.

The invention includes a configuration (for example, a configuration having the same function, method, and result, or a configuration having the same advantage and effect) which is substantially the same as those described in the embodiment. Moreover, the invention includes a configuration in which a non-essential portion of the configurations described in the embodiment is replaced. Moreover, the invention includes a configuration providing the same operational effects as those described in the embodiment, or a configuration capable of achieving the same advantages. Moreover, the invention includes a configuration in which a publicly known technique is added to the configurations described in the embodiment.

The entire disclosure of Japanese Patent Application No. 2011-129135, filed Jun. 9, 2011 is expressly incorporated by reference herein.

What is claimed is:

1. A swing analyzing device comprising: an angular velocity sensor which detects angular velocities generated about a plurality of axes by a swing;
 a data acquiring unit which acquires detection data of the angular velocity sensor; and
 a motion detecting unit which detects at least one of motions of the swing, wherein the motion detecting unit includes an angular velocity calculating unit which calculates sum of magnitudes of the angular velocities generated about the plurality of respective axes using the acquired detection data; and
 wherein the motion detecting unit further includes an impact detecting unit which detects a timing of an impact in the swing using the sum of the magnitudes of the angular velocities, and detects each of the motions of the swing on the basis of the timing of the impact; and wherein the motion detecting unit further includes a differential calculating unit which differentiates the sum of the magnitudes of the angular velocities with respect to time.

2. The swing analyzing device according to claim 1, wherein
the impact detecting unit detects the timing at which the sum of the magnitudes of the angular velocities is maximal as the timing of the impact.

3. The swing analyzing device according to claim 1, wherein
the impact detecting unit detects, between the timing at which a value of the differential is maximal and the timing at which a value of the differential is minimal, the prior timing as the timing of the impact.

4. The swing analyzing device according to claim 1, wherein
the motion detecting unit detects a timing at which the sum of the magnitudes of the angular velocities is a local minimum before the impact as a timing of top of the swing.

5. The swing analyzing device according to claim 1, wherein
the motion detecting unit specifies a continuous interval in which the sum of the magnitudes of the angular velocities is a first threshold value or less before the impact as a top interval.

6. The swing analyzing device according to claim 4, wherein
the motion detecting unit detects a timing at which the sum of the magnitudes of the angular velocities is a second threshold value or less before the top as a timing of start of the swing.

7. The swing analyzing device according to claim 1, wherein
the motion detecting unit detects a timing at which the sum of the magnitudes of the angular velocities is a local minimum after the impact as a timing of finish of the swing.

8. The swing analyzing device according to claim 1, wherein
the motion detecting unit detects a first timing at which the sum of the magnitudes of the angular velocities is a third threshold value or less after the impact as a timing of finish of the swing.

9. The swing analyzing device according to claim 1, wherein
the motion detecting unit specifies a continuous interval in which the sum of the magnitudes of the angular velocities is a fourth threshold value or less after the timing of the impact and close to the timing of the impact as a finish interval.

10. The swing analyzing device according to claim 1, further comprising a display processing unit which calculates, based on each of the motions of the swing detected by the motion detecting unit, a time of each of the motions of the swing and displays a calculation result on a screen.

11. The swing analyzing device according to claim 1, wherein
the angular velocity sensor is mountable on at least one of a user's hand, a glove, and swing equipment.

12. The swing analyzing device according to claim 1, wherein
the swing is a golf swing.

13. The swing analyzing device according to claim 12, wherein
the motion detecting unit detects rhythms of start of the swing, back swing, top, down swing, impact, follow through, and end of the swing.

14. A swing analyzing program, embodied on a non-transitory computer readable medium, causing a computer to function as:
a data acquiring unit which acquires detection data of an angular velocity sensor detecting angular velocities generated about a plurality of axes by a swing; and
a motion detecting unit which detects at least one of motions of the swing, wherein the motion detecting unit includes an angular velocity calculating unit which calculates sum of magnitudes of the angular velocities generated about the plurality of respective axes using the acquired detection data; and
wherein the motion detecting unit further includes an impact detecting unit which detects a timing of an impact in the swing using the sum of the magnitudes of the angular velocities, and detects each of the motions of the swing on the basis of the timing of the impact; and
wherein the motion detecting unit further includes a differential calculating unit which differentiates the sum of the magnitudes of the angular velocities with respect to time.

* * * * *